Oct. 29, 1940.   W. OWEN   2,219,698
METHOD AND APPARATUS FOR SEVERING GLASS SHEETS
Filed Nov. 4, 1937   5 Sheets-Sheet 2
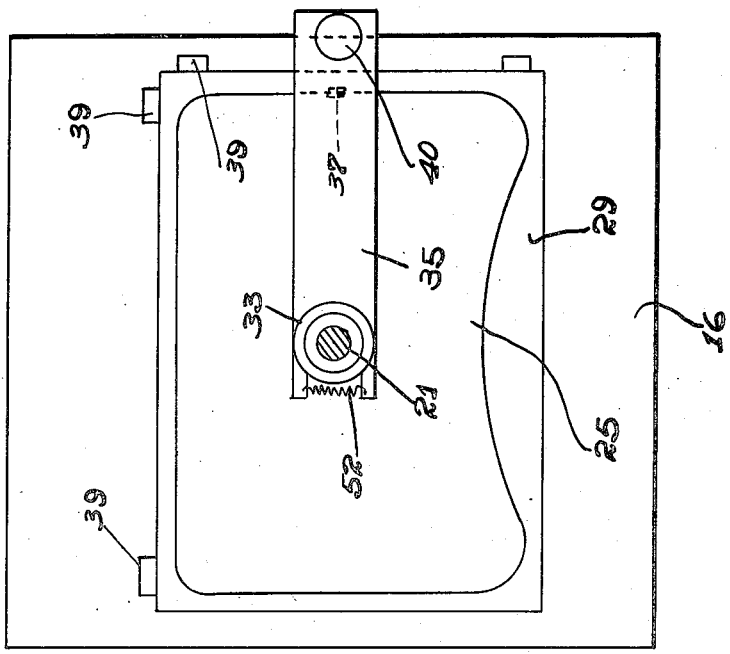
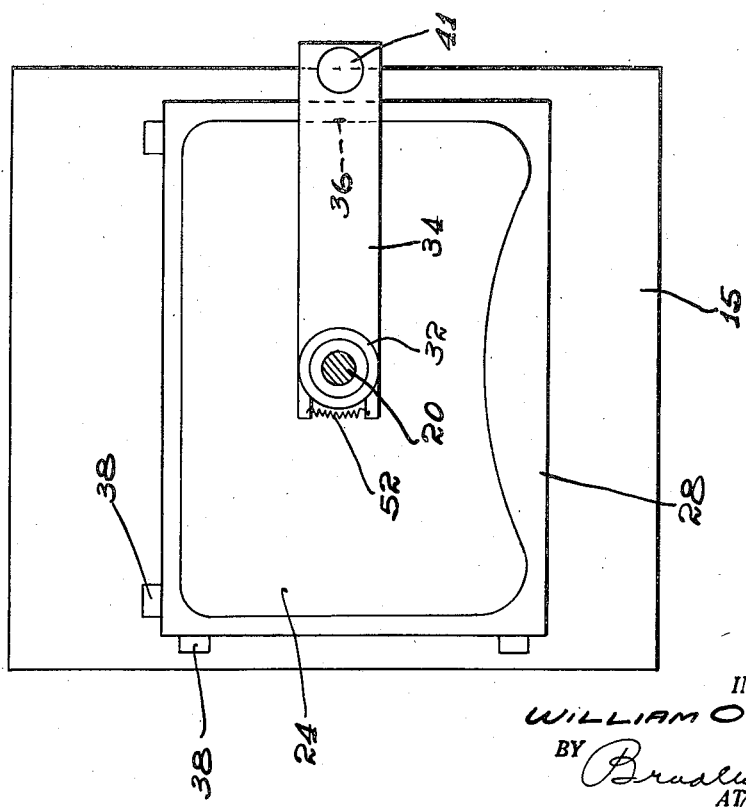
INVENTOR.
WILLIAM OWEN
BY Bradley & Bee
ATTORNEYS.

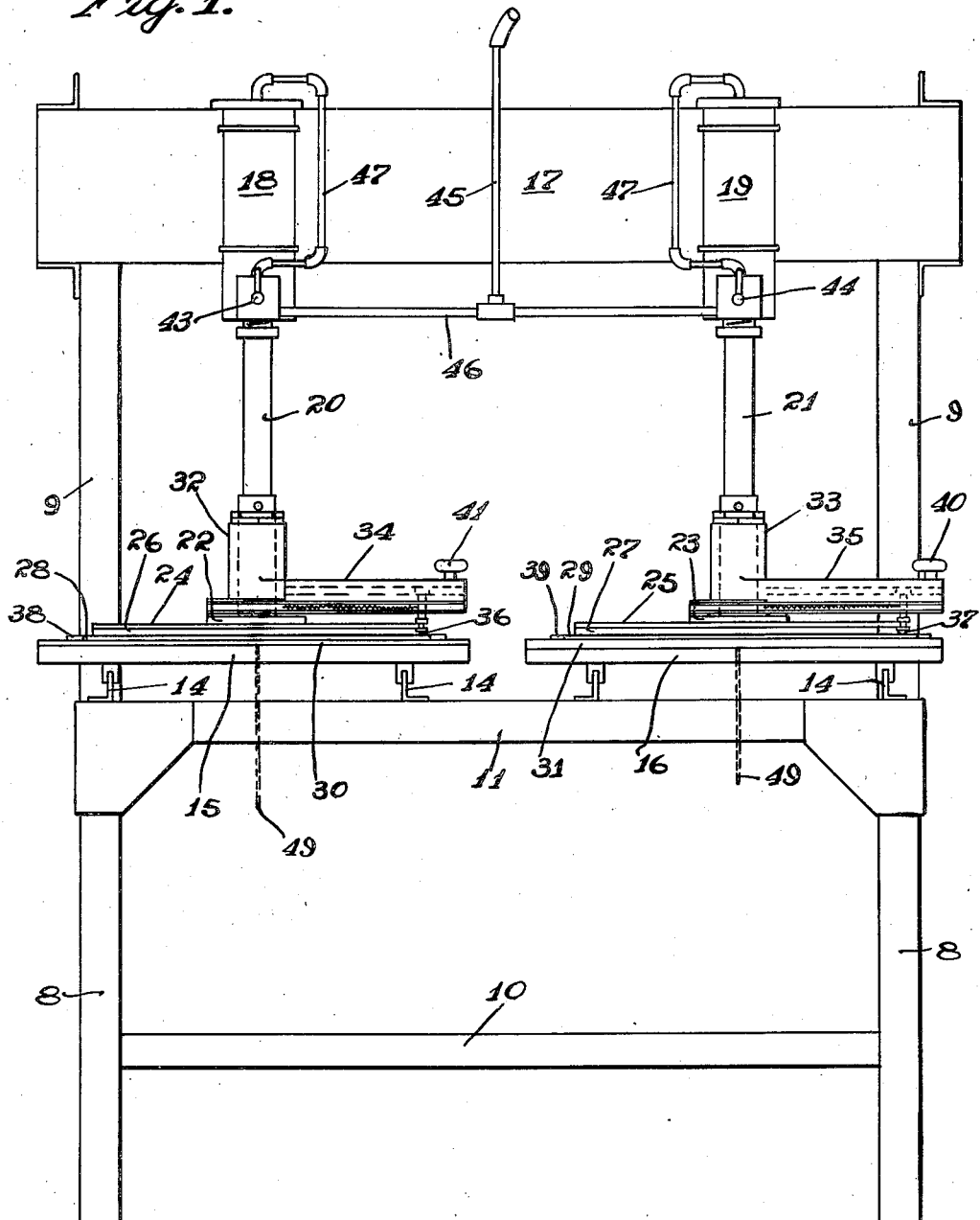

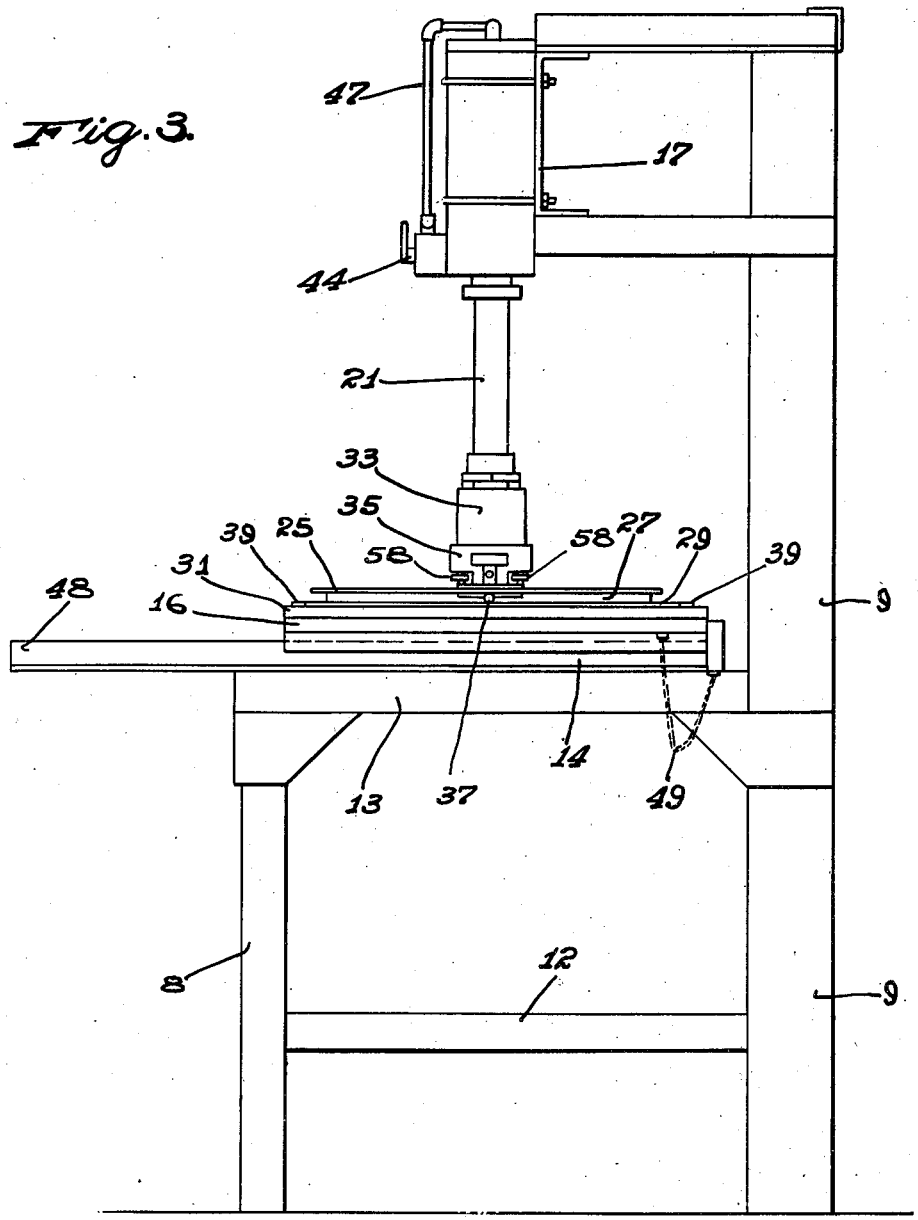

Oct. 29, 1940.   W. OWEN   2,219,698
METHOD AND APPARATUS FOR SEVERING GLASS SHEETS
Filed Nov. 4, 1937   5 Sheets-Sheet 4
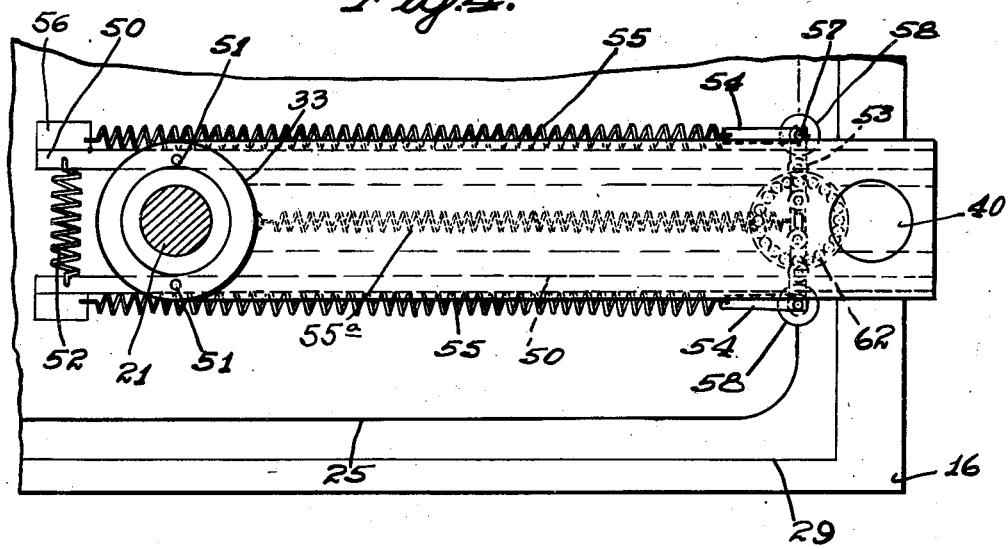
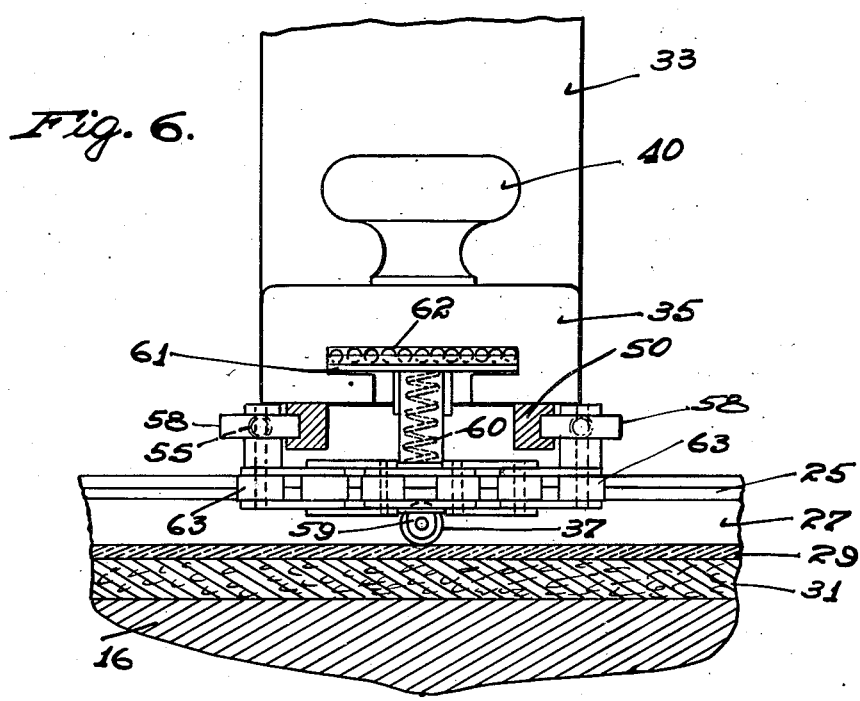
INVENTOR.
WILLIAM OWEN
BY Bradley+Bee
ATTORNEYS.

Oct. 29, 1940.    W. OWEN    2,219,698
METHOD AND APPARATUS FOR SEVERING GLASS SHEETS
Filed Nov. 4, 1937    5 Sheets-Sheet 5

INVENTOR.
WILLIAM OWEN
BY
ATTORNEYS.

Patented Oct. 29, 1940

2,219,698

UNITED STATES PATENT OFFICE 2,219,698

METHOD AND APPARATUS FOR SEVERING GLASS SHEETS

William Owen, Pittsburgh, Pa., assignor to Pittsburgh Plate Glass Company, Allegheny County, Pa., a corporation of Pennsylvania Application November 4, 1937, Serial No. 172,742

7 Claims. (Cl. 49—48)

The invention relates to a method and apparatus for severing glass sheets, and is particularly applicable to such operations wherein the cuts follow curved arcs and the glass is of the heavier grades. A large use of the invention is in cutting shapes from plate glass for use in automobiles, in which the usual thickness for case hardened or ordinary annealed glass is about one quarter of an inch. With glass of this type, or thicker, difficulty is experienced in running the cut after the scoring operation, and the line of the break often lying at some part of its length instead of diagonals at some part of its length instead of lying at right angles to the faces of the plate. This condition requires more grinding of the edge of the plate than would otherwise be required.

Figure 5:
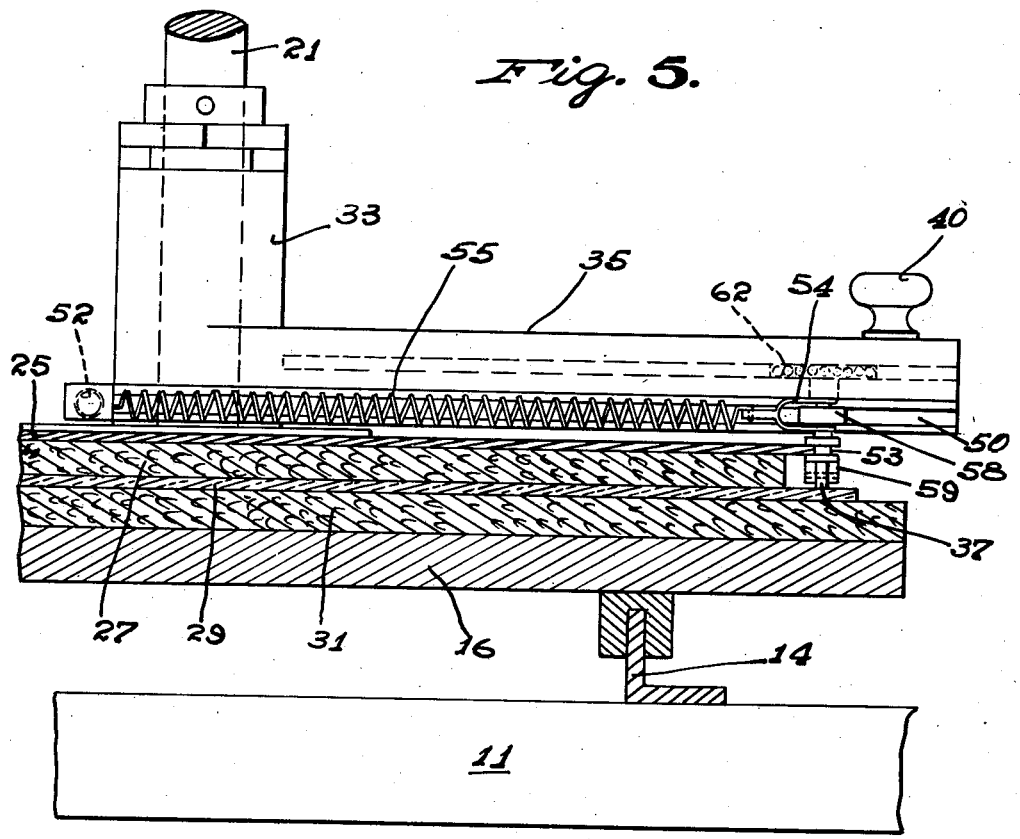
Figure 7:
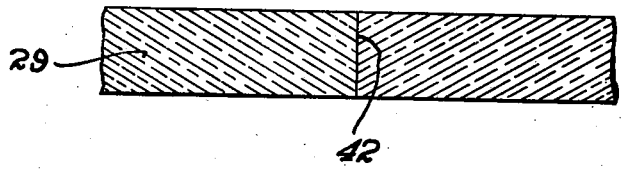

The present invention is designed to overcome the difficulties set forth by providing a means and operation for reducing the difficulty of running a cut and for insuring that the plane of the edge cut is at right angles to the faces of the plate. Briefly stated, this is accomplished by turning the plate upside down, after the scoring operation, supporting it on a yielding surface with the scored face down, and running the cut by following along such cut on the upper face of the plate with a roll or equivalent means, on which pressure is applied sufficient to cause the plate to crack along the line of scoring. One embodiment of the invention is illustrated in the accompanying drawings, wherein:

Figure 1 is a front elevation. Fig. 2 is a diagrammatic plan view. Fig. 3 is a side elevation. Figs. 4, 5 and 6 are enlarged detail views of the arm, which carries the element for applying pressure to crack the glass, Fig. 4 being a plan view, Fig. 5 a side elevation partially in section, and Fig. 6 an end elevation partially in section. And Fig. 7 is a section through a piece of glass which has been separated on a very much enlarged scale.

Referring to the drawings, the framework of the apparatus comprises the vertical members 8, 8, and 9, 9 (Figs. 1 and 3) and the transverse members 10, 11, 12 and 13 suitably secured together by bolting or welding. The members 11 carry the four guides 14, on which the tables 15 and 16 are slidably mounted, such tables acting as supports for the glass sheets in the scoring and cracking off operations, as later described.

The members 9, 9 (Fig. 3) extend above the tables and are provided with brackets 17, to which the two cylinders 18 and 19 are attached. These cylinders are each provided with a piston having the plungers 20 and 21, to which the presser plates 22 and 23 are attached at the extreme lower ends of the plungers. Secured to these plates are the two templets 24 and 25 whose contour determines the movement of the scoring and cracking off elements, as later described. The templets have secured to their lower faces sheets of resilient material 26 and 27 of felt or the like for making clamping engagements with the glass sheets 28 and 29 supported on the tables. The table 15 is also provided with a felt sheet 30 for cushioning the glass, while the table 16 is provided with a similar sheet of felt 31, which is somewhat thicker. The sheet 31 extends substantially beyond the edges of the templet so that the glass is resiliently supported upon both sides of the line of score.

Swivelled on the lower ends of the plungers 20 and 21 are the hubs 32 and 33 provided with the arms 34 and 35. The arm 34 carries a scoring tool 36, such as a wheel or diamond, while the arm 35 carries a presser roll 37, these elements being so mounted on the arms that when the arms are rotated on the plungers, the scoring and cracking off elements are guided by the templets 24 and 25 and follow similar paths. The character of the templets will be seen by reference to Fig. 2, as well as their relation to the glass plates 28 and 29. In scoring the glass sheet on the table 30, such plate is positioned by four stops 38, which are secured to the top of the table by means of screws so that their position may be altered to meet requirements. Similarly, the glass plate 29 is positioned on the table 16 by means of the four stops 39. In operation, after the plate 28 has been scored to conform to the shape of the templet by swinging the arm carrying the cutter around its axis, the glass plate is released by reversing the operation of the plunger 20 and is removed from the table 15 and placed on the table 16 in reverse position so that the scored surface is down. The plate is here positioned by the stops 39 which, as shown in Figure 2, are disposed in opposite-hand or mirror relationship with respect to the stops 38 so that the glass will always be correctly centered even when the sheet is inverted and the plunger 21 is operated to clamp the glass plate in position. It is now ready for the cracking off operation, which is accomplished by swinging the arm 21 around its axis with the presser roll 37 forced downward by the spring 60 below the handle 40, a similar handle 41 being provided on the scoring arm 34. The pressure applied by the roll 37 causes the glass to crack in opposition to such roll along the line 42, as indicated in Fig. 7, and as illustrated in this figure, the edge surface of the sheet is at right angles to the faces of the sheet, which condition exists throughout the length of the edge. This figure serves to illustrate the purpose of the invention, as heretofore set forth, which is to produce edge surfaces which do not diagonal with respect to the faces of the glass sheets, but are at right angles thereto. This reduces the amount of grinding subsequently required in order to true up the edge and is increasingly important as the thickness of the sheets increase.

The up and down movement of the plungers 20 and 21 is regulated by means of the valves 43 and 44 which control the flow of operating air through the connections 45, 46 and 47. In order to facilitate the removal of the glass plates from the tables and their application thereto, the tables are mounted for sliding movement on their guides 14 so that they may be moved laterally from beneath the plungers onto the extensions 48 (Fig. 3) in applying the plates to the tables or in removing them therefrom, and the outward movement of the tables on the extensions is limited by the stop chains 49.

The construction of the arms 34 and 35 which carry the scoring and presser elements and permit such elements to follow the contour of the templets 24 and 25 is shown in Figs. 4 to 6. The construction of the two arms is the same throughout so that a description of one of the arms will be sufficient. The arm 35 shown in Figs. 4 to 6 carries the presser roll 37 for running the cut, and it will be understood that in the arm 34 used above the table 15, this element 37 is replaced by the scoring wheel 36 or by a diamond. The arm 35 has pivoted thereto adjacent the hub 33 a pair of bars 50, 50, such bars being mounted upon the pivots 51 (Fig. 4) on the arm 35 and lying beneath such arm at the sides thereof, as indicated in Fig. 6. The rear ends of the bars 50 are connected by a spring 52 which tends to separate the front ends of the bars. The bars are held against separation at their front ends by means of a chain 53 provided at its ends with the links 54, which are held under tension by the springs 55 extending to the rear and attached to blocks 56 carried by the rear ends of the bars 50. The links 54 are connected to the ends of the chain 53 by means of the vertical pivots 57 (Fig. 4) and the upper ends of these pivots carry the rolls 58, which ride in the ends of the arms 50, as indicated in Fig. 6. The middle portion of the chain 53 is provided with brackets 59, in which the presser roll 37 is mounted. Pressure is applied above the roller 37 by means of a spring 60 bearing against the plate 61, which in turn carries the balls 62 mounted in a recess in the end of the arm. An antifriction thrust bearing is thus provided in opposition to the roll 37.

The chain is of the roller type and the side bars of the chain on opposite sides of the roller members 63 lie on opposite sides of the edge of the templet, as indicated in Figs. 5 and 6, so that the end of the arms 50 have only limited vertical play, being stopped in their up and down movement by the engagement of the side plates of the chain with the upper and lower edges of the templet. The arrangement as described provides a flexible support for the presser roll 37 so that as the arm 35 is swung around its axis, the roll can follow around the curves of the templet to correspond with the line of scoring on the glass sheet. The central portion of the chain is pulled inward against the edge of the templet 25 by means of a spring 55a (Fig. 4), the inner end of the spring being attached to the hub 33. In the case of the cutter arm 34, which carries the scoring tool, the only difference in construction from that above described, lies in the fact that a scoring wheel or diamond is substituted for the presser wheel 37. In the operation of both arms, the operator moves the arms by the knobs 40 and 41 and the spring 60 applies such downward pressure as may be necessary to give proper scoring and cracking off. In operating the presser arm to run the cut, the glass cracks opposite the presser roll and extends progressively around the glass sheet as the operator swings the arm through its circuit. It will be understood with respect to the cutter and presser arms, that various expedients may be employed for mounting the cutting and pressing elements flexibly and for guiding them on the templets other than the chain arrangement, as above described. The only requirement is that the cutter head be made to follow the templet by means of yielding devices normally pressing such head toward the axis of rotation with the cutter or presser element so mounted that it can follow curves without binding.

What I claim is:

1. Means for cracking off a glass plate which has been scored to a predetermined contour comprising a table having a yielding surface for supporting the plate, a templet fixed above the table and having a contour corresponding to the contour of the scoring on the plate, stop means on the table for positioning the glass plate with relation to the templet, and presser means mounted for movement above the table, including a roller for contacting with the glass plate opposite the line of scoring and engaging and guided by the templet, so that in following such templet, pressure is progressively applied along a line parallel to and lying in the same vertical plane as the line of score.

2. Means for cracking off a glass plate which has been scored to a predetermined contour comprising a table having a yielding surface for supporting the plate, a vertically movable head in opposition to the table, a templet carried by the head having on its lower side a layer of yielding material, means for moving the head up and down and holding it in lower position clamping a glass plate to be scored between the table and the yielding layer on the templet, stop means on the table for positioning the glass plate with relation to the templet and presser means mounted for movement on the head including a roller for contacting with the glass plate opposite the line of scoring and engaging and guided by the templet, so that in following such templet pressure is progressively applied along a line parallel to and lying in the same vertical plane as the line of score.

3. Apparatus for breaking glass plates to conform to a line of score laid in a definite pattern, comprising a support for the plates, a templet corresponding in contour to the line of score, said templet being mounted for vertical reciprocation, a breaking roller movable over the surface of the support, and guide means secured to the roller and engaging the edge of the templet to direct the path of the roller along the line of score of the glass.

4. A method of severing a glass plate which comprises scoring it along the desired line of separation on one face, inverting the plate and supporting it upon a flat yielding surface with the scored face in direct contact therewith, and then progressively applying downward pressure to the uppermost surface of the glass along a line parallel to and lying in the same vertical plane as the line of score.

5. A method of severing a glass plate which comprises scoring it along the desired line of separation on one face, inverting the plate and supporting it upon a flat yielding surface with the scored line and the portions of glass immediately adjacent the line of score in direct contact with such surface, and then progressively applying downward pressure to the uppermost surface of the glass along a line parallel to and lying in the same vertical plane as the line of score.

6. A method of severing a glass plate as defined in claim 4 in which the line of separation scored on one face of the glass plate is endless.

7. A method of severing a glass plate as defined in claim 5, in which a downward rolling pressure is progressively applied to the uppermost of the surface glass along a line parallel to and lying in the same vertical plane as the line of score.

WILLIAM OWEN.